(12) United States Patent
Wang et al.

(10) Patent No.: US 12,450,393 B2
(45) Date of Patent: Oct. 21, 2025

(54) METHOD, ELECTRONIC DEVICE, AND COMPUTER PROGRAM PRODUCT FOR PROCESSING DATA

(71) Applicant: Dell Products L.P., Round Rock, TX (US)

(72) Inventors: Zijia Wang, Weifang (CN); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 249 days.

(21) Appl. No.: 18/341,380

(22) Filed: Jun. 26, 2023

(65) Prior Publication Data

US 2024/0403483 A1 Dec. 5, 2024

(30) Foreign Application Priority Data

Jun. 2, 2023 (CN) .......................... 202310651935.5

(51) Int. Cl.
*G06F 21/00* (2013.01)
*G06F 21/62* (2013.01)

(52) U.S. Cl.
CPC ................................ *G06F 21/6254* (2013.01)

(58) Field of Classification Search
CPC .................... G06F 21/6254; G06F 21/6245
See application file for complete search history.

(56) References Cited

U.S. PATENT DOCUMENTS

| 11,755,848 | B1 * | 9/2023 | Dan | ...................... G06N 20/00 704/270.1 |
| 2019/0327501 | A1 * | 10/2019 | Walters | ................... G06F 16/93 |
| 2020/0372369 | A1 * | 11/2020 | Gong | ..................... G06N 3/047 |
| 2021/0042614 | A1 * | 2/2021 | Walters | ................... G06F 18/24 |
| 2023/0153455 | A1 * | 5/2023 | Jiang | .................. G06F 16/2457 726/30 |

(Continued)

OTHER PUBLICATIONS

Yan et al., "Active Distribution System Synthesis via Unbalanced Graph Generative Adversarial Network", IEEE Transactions on Power Systems, vol. 38, No. 5, Sep. 2022.*

(Continued)

*Primary Examiner* — Morshed Mehedi
(74) *Attorney, Agent, or Firm* — Ryan, Mason & Lewis, LLP

(57) ABSTRACT

Embodiments of the present disclosure involve a method, an electronic device, and a computer program product for processing data. The method includes detecting a type of the data, wherein the data includes sensitive data. The method further includes selecting, according to the detected type, a generative model corresponding to the detected type from a plurality of generative models. The method further includes processing the data by using the selected generative model to desensitize the sensitive data from the data. The method for processing data according to embodiments of the present disclosure processes the data by combining various types of generative models, and the application potentials of various generative models can be fully exploited, so that desensitization processing of a plurality of types of data can be realized more quickly and accurately, and leakage of sensitive information can be avoided, thereby ensuring the security of various types of data.

20 Claims, 9 Drawing Sheets

(56) References Cited

U.S. PATENT DOCUMENTS

2024/0070439 A1* 2/2024 Segars .................. G06N 3/094

OTHER PUBLICATIONS

Sambrekar et al., "A Proposed Technique for Conversion of Unstructured Agro-data to Semi-structured or Structured data", 2018 Fourth International Conference on Computing Communication Control and Automation (ICCUBEA), Date of Conference: Aug. 16-18, 2018.*
Q. Li et al., "A Deep Multimodal Generative and Fusion Framework for Class-imbalanced Multimodal Data," Multimedia Tools and Applications, vol. 79, Jun. 28, 2020, 28 pages.
A. Ramesh et al., "Zero-Shot Text-to-Image Generation," International Conference on Machine Learning, arXiv:2102.12092v2, Feb. 26, 2021, 20 pages.
L. Xu et al., "Modeling Tabular Data using Conditional GAN," 33rd Conference on Neural Information Processing Systems, Dec. 2019, 11 pages.
S.-C. Li et al., "Evaluating Variational Autoencoder as a Private Data Release Mechanism for Tabular Data," IEEE 24th Pacific Rim International Symposium on Dependable Computing (PRDC), Dec. 2019, pp. 198-206.

* cited by examiner

| | Score | Comment | Commodity | User name |
|---|---|---|---|---|
| 2017-10-04 | 5 | The quality of this trench coat is very good | Trench coat | User A |
| 2017-10-08 | 4 | Good quality and low price, worth buying again | Chair | User B |
| 2017-11-20 | 4.5 | Very comfortable to wear | Sneakers | User C |
| 2017-12-21 | 5 | The sound quality of the headphones is very good | Headphones | User D |

FIG. 4A

| | Score | Comment | Commodity | XXXX |
|---|---|---|---|---|
| 2017-10-04 | 5 | The quality of this trench coat is very good | Trench coat | XXXX |
| 2017-10-08 | 4 | Good quality and low price, worth buying again | Chair | XXXX |
| 2017-11-20 | 4.5 | Very comfortable to wear | Sneakers | XXXX |
| 2017-12-21 | 5 | The sound quality of the headphones is very good | Headphones | XXXX |

FIG. 4B

Input                                810

Chen purchased a pair of headphones and a pair of sneakers on May 25

Initial prompt                       820

Please hide sensitive information in the text

Clear          Submit

C purchased some items

FIG. 8B

METHOD, ELECTRONIC DEVICE, AND COMPUTER PROGRAM PRODUCT FOR PROCESSING DATA

RELATED APPLICATION

The present application claims priority to Chinese Patent Application No. 202310651935.5, filed Jun. 2, 2023, and entitled "Method, Electronic Device, and Computer Program Product for Processing Data," which is incorporated by reference herein in its entirety.

FIELD

Embodiments of the present disclosure relate to the field of computers, and more specifically, to a method, an electronic device, and a computer program product for processing data.

BACKGROUND

In recent years, with the continuous development of Internet technologies, users can find increasingly more data through searching, thus obtaining more information. However, in the data, some data contains sensitive information (such as privacy information of individual users and confidential information of enterprises). If the data is not processed but directly disclosed, it will lead to the leakage of sensitive information, thereby leading to security issues. Therefore, effective technical measures need to be taken to process the data.

SUMMARY

A method, an electronic device, and a computer program product for processing data are provided in embodiments of the present disclosure.

According to a first aspect of the present disclosure, a method for processing data is provided. The method includes detecting a type of the data, wherein the data includes sensitive data. The method further includes selecting, according to the detected type, a generative model corresponding to the type from a plurality of generative models. The method further includes processing the data by using the selected generative model to desensitize the sensitive data from the data. The type includes at least one type of a tabular type, a semi-structured data type, an image type, and a text type, the plurality of generative models include a first generative model corresponding to the tabular type, a second generative model corresponding to the image type, and a third generative model corresponding to the text type, and the first generative model, the second generative model, and the third generative model are different from one another.

According to a second aspect of the present disclosure, an electronic device is provided. The electronic device includes at least one processor; and a memory coupled to the at least one processor and having instructions stored thereon, wherein the instructions, when executed by the at least one processor, cause the device to perform actions including: detecting a type of data, wherein the data includes sensitive data; selecting, according to the detected type, a generative model corresponding to the type from a plurality of generative models; and processing the data by using the selected generative model to desensitize the sensitive data from the data, wherein the type may include at least one type of a tabular type, a semi-structured data type, an image type, and a text type, the plurality of generative models include a first generative model corresponding to the tabular type, a second generative model corresponding to the image type, and a third generative model corresponding to the text type, and the first generative model, the second generative model, and the third generative model are different from one another.

According to a third aspect of the present disclosure, a computer program product is provided. The computer program product is tangibly stored on a non-transitory computer-readable medium and includes machine-executable instructions, wherein the machine-executable instructions, when executed by a machine, cause the machine to perform steps of the method in the first aspect of the present disclosure.

BRIEF DESCRIPTION OF THE DRAWINGS

By the following description of example embodiments of the present disclosure, provided in more detail herein with reference to the accompanying drawings, the above and other objectives, features, and advantages of the present disclosure will become more apparent, wherein identical reference numerals generally represent identical components in the example embodiments of the present disclosure.

FIG. 4A and FIG. 4B show example diagrams comparing tabular data before and after being processed using a first generative model corresponding to the tabular type according to an embodiment of the present disclosure;

FIG. 8A and FIG. 8B show example diagrams comparing texts before and after being processed using a third generative model corresponding to the text type according to an embodiment of the present disclosure.

In the accompanying drawings, identical or corresponding numerals represent identical or corresponding parts.

DETAILED DESCRIPTION

Figure 1:
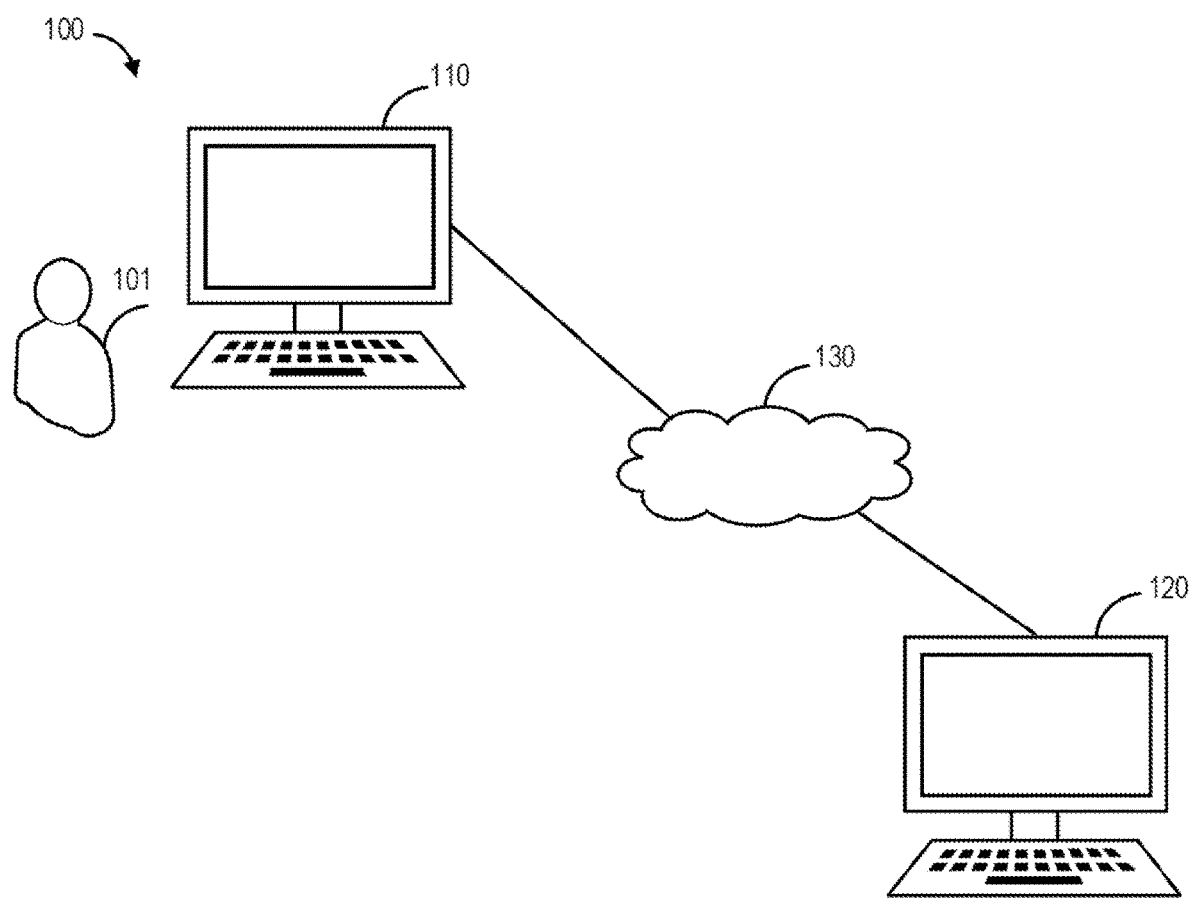
FIG. 1 shows a schematic diagram of an example environment in which a device and/or method according to an embodiment of the present disclosure may be implemented.

The following will describe embodiments of the present disclosure in more detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

With the continuous development of artificial intelligence (AI) technologies, increasingly more enterprises and organizations are using AI technologies to desensitize data, so as to eliminate or obscure ("fuzz") sensitive information in shared data. One adopted solution includes a Privacy Preserving Data Publishing (PPDP) algorithm. By using the PPDP algorithm, synthetic data may be generated. In the synthetic data, sensitive information has been desensitized. The PPDP algorithm can provide data to valid users without exposing sensitive information, thereby protecting sensitive information such as privacy information in the data from being leaked.

Usually, according to whether data has a specific structure, the data may be divided into: structured data, unstructured data, and semi-structured data between the structured data and the unstructured data. The structured data may include data with a specific form or structure, such as tabular data. The unstructured data may include data in no specific format, such as images and texts. The semi-structured data may include data with a certain internal structure but not with a specific structure like that of the structured data, such as a PDF text with some internal structures.

The current PPDP algorithm can only effectively process structured data, for example, tabular data containing characters such as letters and numbers. However, the current PPDP algorithm cannot effectively process unstructured data such as images and texts or semi-structured data. Therefore, there is an urgent need for effective solutions to desensitize various types of data, thereby achieving security of the various types of data.

In order to solve the above and other potential problems, an embodiment of the present disclosure provides a method for processing data. The method includes detecting a type of the data, wherein the data includes sensitive data; selecting, according to the detected type, a generative model corresponding to the type from a plurality of generative models; and processing the data by using the selected generative model to desensitize the sensitive data from the data. The type includes at least one type of a tabular type, a semi-structured data type, an image type, and a text type, the plurality of generative models include a first generative model corresponding to the tabular type, a second generative model corresponding to the image type, and a third generative model corresponding to the text type, and the first generative model, the second generative model, and the third generative model are different from one another. The method for processing data according to embodiments of the present disclosure processes the data by combining various types of generative models, and the application potentials of various generative models can be fully exploited, so that desensitization processing of a plurality of types of data can be realized more quickly and accurately, and leakage of sensitive information can be avoided, thereby ensuring the security of various types of multi-modal data.

Embodiments of the present disclosure will be further described in detail below with reference to the accompanying drawings. FIG. 1 is a schematic diagram of an example environment 100 in which embodiments of the present disclosure can be implemented.

The example environment 100 includes a computing device 110 and a computing device 120, and the computing device 110 and the computing device 120 may be interconnected through various types of networks 130 to achieve communication. In some embodiments, a user 101 may input a searching instruction locally through the computing device 110 to search for required data. The computing devices 110 and 120 may comprise respective local and remote computing devices. The computing device 110 may send the searching instruction input by the user to the computing device 120 through the network 130.

The computing device 120 may receive the searching instruction from the computing device 110 and search for data based on the searching instruction. When the found data includes sensitive data, the computing device 120 according to embodiments of the present disclosure may perform desensitization processing on the sensitive data in the found data, and transmit the desensitized data back to the computing device 110 for display by the computing device 110 to the user 101. Therefore, sensitive information can be prevented from being leaked while meeting searching requirements of the user, thereby ensuring data security.

In some embodiments, the computing device 120 according to embodiments of the present disclosure may retrieve the found data from a database (local or remote database) based on the searching instruction of the user. The computing device 120 may determine whether sensitive data is included in the data. When sensitive data is not included in the data, the computing device 120 may send the data to the computing device 110. When it is determined that the found data includes sensitive data, the computing device 120 may perform desensitization processing on the data including the sensitive data. In some embodiments, the computing device 120 may determine whether sensitive data is included in the data and which data segments in the data include sensitive information according to additional information in the data (such as identifiers of data segments in the data).

In some embodiments, the computing device 120 may detect the type of the data, and select, according to the detected type, a generative model corresponding to the detected type from a plurality of generative models. The computing device 120 may process the data by using the selected generative model to desensitize the sensitive data from the data. In some embodiments, the type may include at least one type of a tabular type, a semi-structured data type, an image type, and a text type, the plurality of generative models may include a first generative model corresponding to the tabular type, a second generative model corresponding to the image type, and a third generative model corresponding to the text type, and the first generative model, the second generative model, and the third generative model are different from one another.

It is to be understood that although for the purpose of illustration, the example environment in which embodiments according to the present disclosure are applied is described in FIG. 1 by using the user 101 searching for data as an example, the present disclosure is not limited to this. According to embodiments of the present disclosure, data in any scenario may be desensitized. In the following description, the data that needs to be desensitized is collectively referred to as "data," and the sensitive data is included in the data.

Furthermore, although the two computing devices 110 and 120 are illustrated in FIG. 1, it may be understood that according to the scenario using embodiments of the present disclosure, the computing devices in FIG. 1 may be any other number of computing devices, which is not limited in the present disclosure.

The computing devices 110 and 120 in FIG. 1 may include, but are not limited to, a personal computer, a server computer, a handheld or laptop device, a mobile device (such as a mobile phone, a personal digital assistant (PDA), and a media player), a multi-processor system, a consumer electronic product, a wearable electronic device, an onboard electronic device, an intelligent home device, a mini-computer, a mainframe computer, an edge computing device, a distributed computing environment including any of the above systems or devices, and the like.

Advantageously, the method for processing data according to embodiments of the present disclosure processes the data by combining various types of generative models, and the application potential of various generative models can be fully exploited, so that desensitization processing of a plurality of types of data can be realized more quickly and accurately, and leakage of sensitive information can be avoided, thereby ensuring the data security of various types of multi-modal data.

Figure 2:
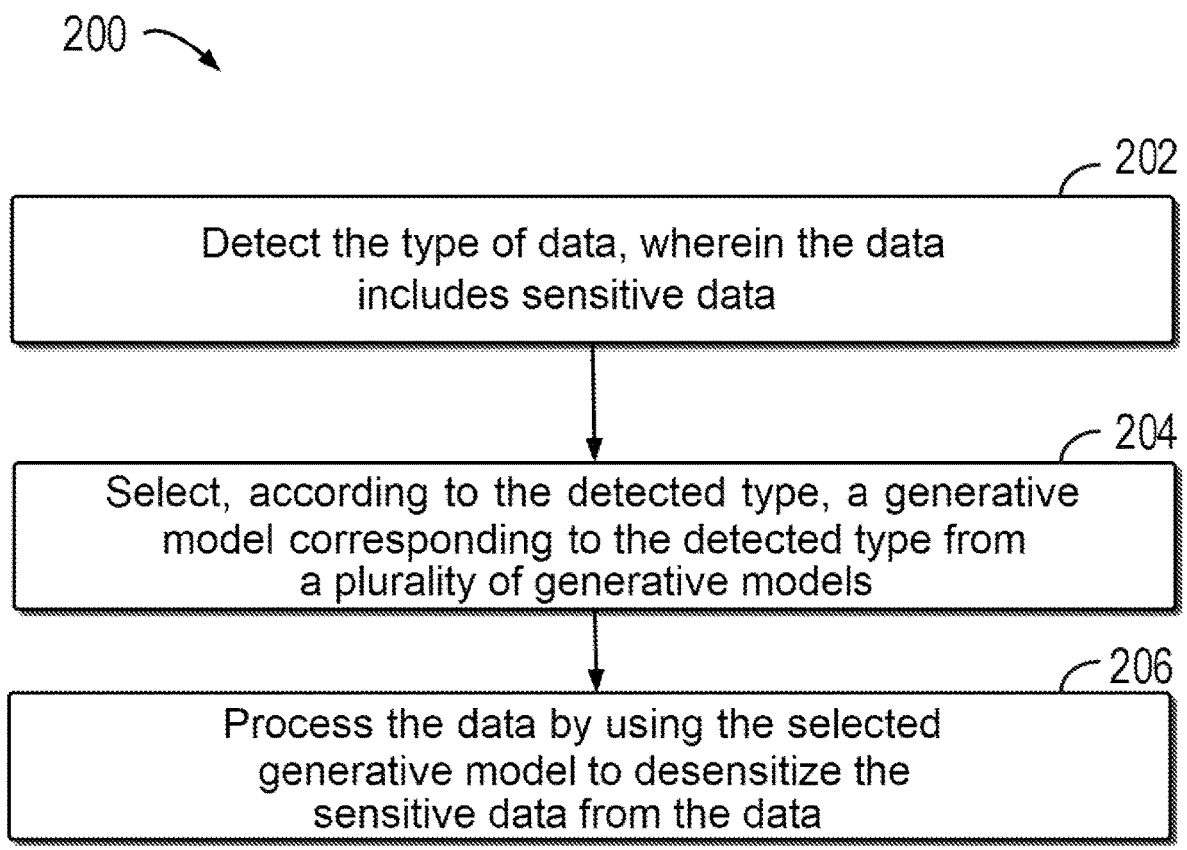
FIG. 2 shows a flow chart of a method for processing data according to an embodiment of the present disclosure.

A block diagram of an example environment 100 in which an embodiment of the present disclosure can be implemented is described above with reference to FIG. 1. A flow chart of a method 200 for processing data according to an embodiment of the present disclosure will be described below with reference to FIG. 2. The method 200 may be performed at the computing device 120 in FIG. 1 or at any suitable computing device.

At block 202, the computing device 120 may detect the type of the data, and sensitive data may be included in the data. In some embodiments, the computing device 120 may receive or acquire the data including the sensitive data. The sensitive data may include various types of information that are not expected to be acquired by third parties, such as privacy information of individual users and confidential information of enterprises or organizations. The specific types, contents, and the like of sensitive information are not limited in the present disclosure.

The type of the data according to embodiments of the present disclosure may include at least one type of a tabular type, a semi-structured data type, an image type, and a text type. For example, data organized together in a table structure may be tabular data of the tabular type. Data represented by images may be data of the image type, and data represented by texts may be data of the text type. Data (such as a PDF text with some internal structures) represented by a certain internal structure but not a specific structure like that of the structured data may be data of the semi-structured data type.

In some embodiments, the computing device 120 may receive or acquire data, and detect the type of the data based on index information included in the data. For example, the data received by the computing device 120 may include predefined index information, and the index information may indicate the type of the data. By detecting the index information, the computing device 120 may determine the type of the data.

At block 204, the computing device 120 may select, according to the detected type of the data, a generative model corresponding to the detected type from a plurality of generative models. In some embodiments, the plurality of generative models include a first generative model corresponding to the tabular type, a second generative model corresponding to the image type, and a third generative model corresponding to the text type. The first generative model, the second generative model, and the third generative model are different from one another. In other words, the first generative model, the second generative model, and the third generative model are different and discrete generative models.

When the computing device 120 detects that the type of the data is the tabular type, the computing device 120 may select the first generative model. The first generative model may include a first generative adversarial network. When the computing device 120 detects that the type of the data is the image type, the computing device 120 may select the second generative model, and the second generative model may include a second generative adversarial network. Moreover, the first generative adversarial network and the second generative adversarial network are different generative adversarial networks. When the computing device 120 detects that the type of the data is the text type, the computing device 120 may select the third generative model.

In addition, when the computing device 120 detects that the type of the data is the semi-structured data type, the computing device 120 may convert the data of the semi-structured data type to tabular data, and then select the first generative model corresponding to the tabular type from the plurality of generative models, so as to process the data of the semi-structured data type. A process of conversion between data and images will be described below with reference to the accompanying drawings.

At block 206, the computing device 120 may process the data by using the selected generative model to desensitize the sensitive data from the data. After selecting the generative model according to the detected type, the computing device 120 may process the data by using the selected model to desensitize the sensitive data from the data. For example, the computing device 120 may use the selected generative model to generate synthetic data. In the synthetic data, non-sensitive data in the data may be retained, while the sensitive data may be removed, replaced, or fuzzed, thereby avoiding the leakage of the sensitive data.

Figure 3:
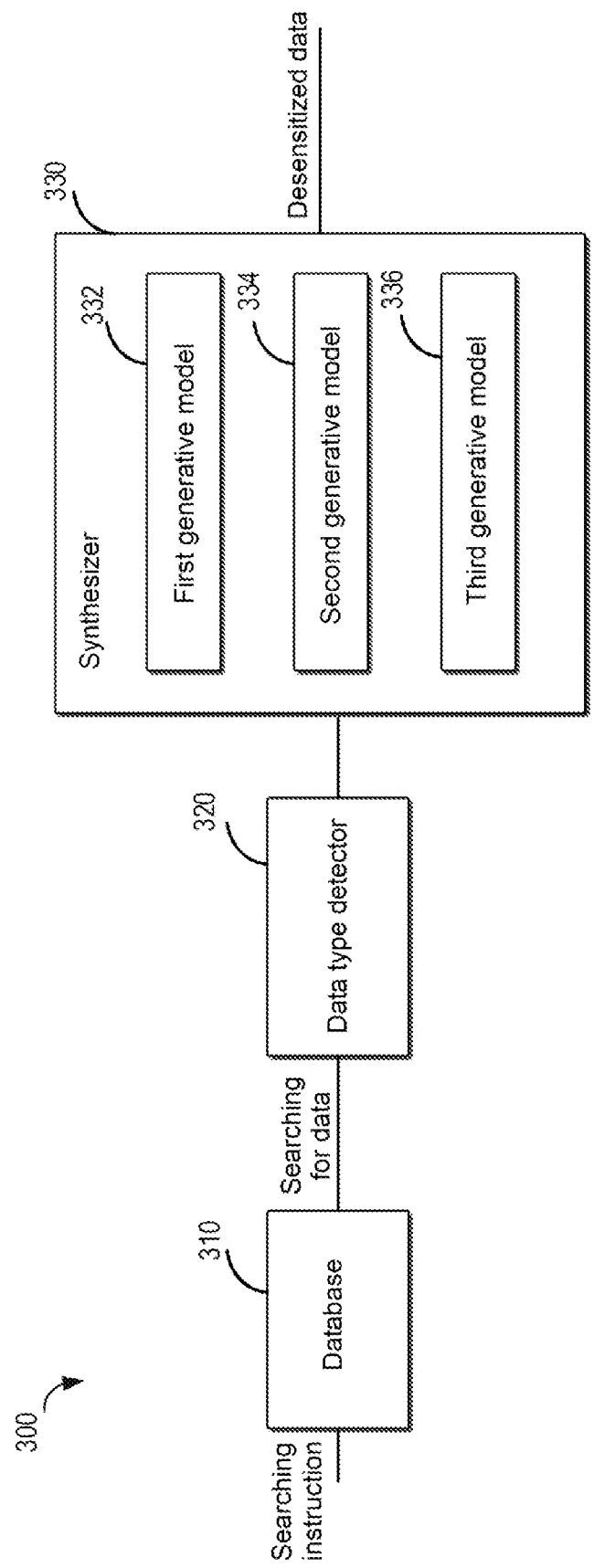
FIG. 3 shows a block diagram of an example system architecture capable of implementing processing of data according to the present disclosure.

FIG. 3 shows a system architecture 300 that may achieve data processing according to an embodiment of the present disclosure. The system architecture 300 in FIG. 3 is illustrated with the example of desensitizing the found data. However, it is to be understood that the method for processing data according to embodiments of the present disclosure may be applied to any other scenario that requires desensitization of data.

As shown in FIG. 3, the system architecture 300 may include a database 310, a data type detector 320, and a synthesizer 330. The data type detector 320 and the synthesizer 330 may be implemented by hardware, software, or a combination of software and hardware, which is not limited in the present disclosure. In some embodiments, the synthesizer 330 according to embodiments of the present disclosure may include a first generative model 332, a second generative model 334, and a third generative model 336. As described above, the first generative model 332 may correspond to the tabular type, the second generative model 334 may correspond to the image type, and the third generative model 336 may correspond to the text type. In addition, the first generative model 332, the second generative model 334, and the third generative model 336 are different from one another. In other words, the first generative model 332, the second generative model 334, and the third generative model 336 are different and discrete generative models.

During operation, the computing device 120 may receive a searching instruction from a user and search for data in the database 310 according to the searching instruction, thereby obtaining found data. The computing device 120 may obtain the found data, and send the found data to the data type detector 320, so that the data type detector 320 detects the type of the data. After determining the type of the data, the computing device 120 may further send the data to the synthesizer 330, and select, according to the detected type, a generative model corresponding to the type of the data from the first generative model 332, the second generative model 334, and the third generative model 336 in the synthesizer, for desensitizing the data. The description of the flow chart of the method 200 with reference to FIG. 2 above may be referred to for a specific implementation process, which will not be repeated here for simplicity.

It is to be understood that the database 310, the data type detector 320, and the synthesizer 330 in the system architecture 300 in FIG. 3 may be located in the same device or located in different devices, and connected and communicated through a network or the like. For example, the database 310 may be locally in or remotely from the computing device 120, and the data type detector 320 and the synthesizer 330 may be locally in the computing device. Whether the components in the system architecture 300 in FIG. 3 are located in the same device is not limited in the present disclosure. Those skilled in the art may configure the components according to needs or application requirements.

As described above, when it is detected that the type of the data is the tabular type, the computing device 120 may select the first generative model 332 to desensitize the data. In some embodiments, the first generative model may include a first generative adversarial network (GAN), such as a conditional generative adversarial network (CGAN). A trained conditional GAN may learn underlying data distribution of the data and generate generative data that protects sensitive information in the data while maintaining the structure and features of the tabular data.

FIG. 4A and FIG. 4B show example diagrams comparing tabular data before and after being processed using a conditional GAN corresponding to the tabular type according to an embodiment of the present disclosure. A table in FIG. 4A may be original data. The tabular data includes comments on purchased products by a plurality of users, purchase dates, product names, and user names. When a user (such as the user 101 in FIG. 1) wishes to view product comments, ratings, and other information through a searching operation, the computing device 120 may desensitize sensitive information (such as user names) in the original data.

For example, for the original data of the tabular type, the computing device 120 may generate a table as shown in FIG. 4B through a conditional GAN, and in the table in FIG. 4B, information about user names is replaced with "XXXX" to avoid sensitive data such as user names from being leaked.

It is to be understood that the example tables in FIG. 4A and FIG. 4B are only illustrative. The data processing method according to embodiments of the present disclosure may perform desensitization processing on tables containing various contents, thereby avoiding leakage of sensitive information in the tables, and further ensuring the data security of the tabular data.

In some embodiments, when the computing device 120 detects that the type of the data is the semi-structured data type, the computing device 120 may convert the data of the semi-structured data type into tabular data, and then select the first generative model corresponding to the tabular type from the plurality of generative models to process the data of the semi-structured data type.

Figure 5:
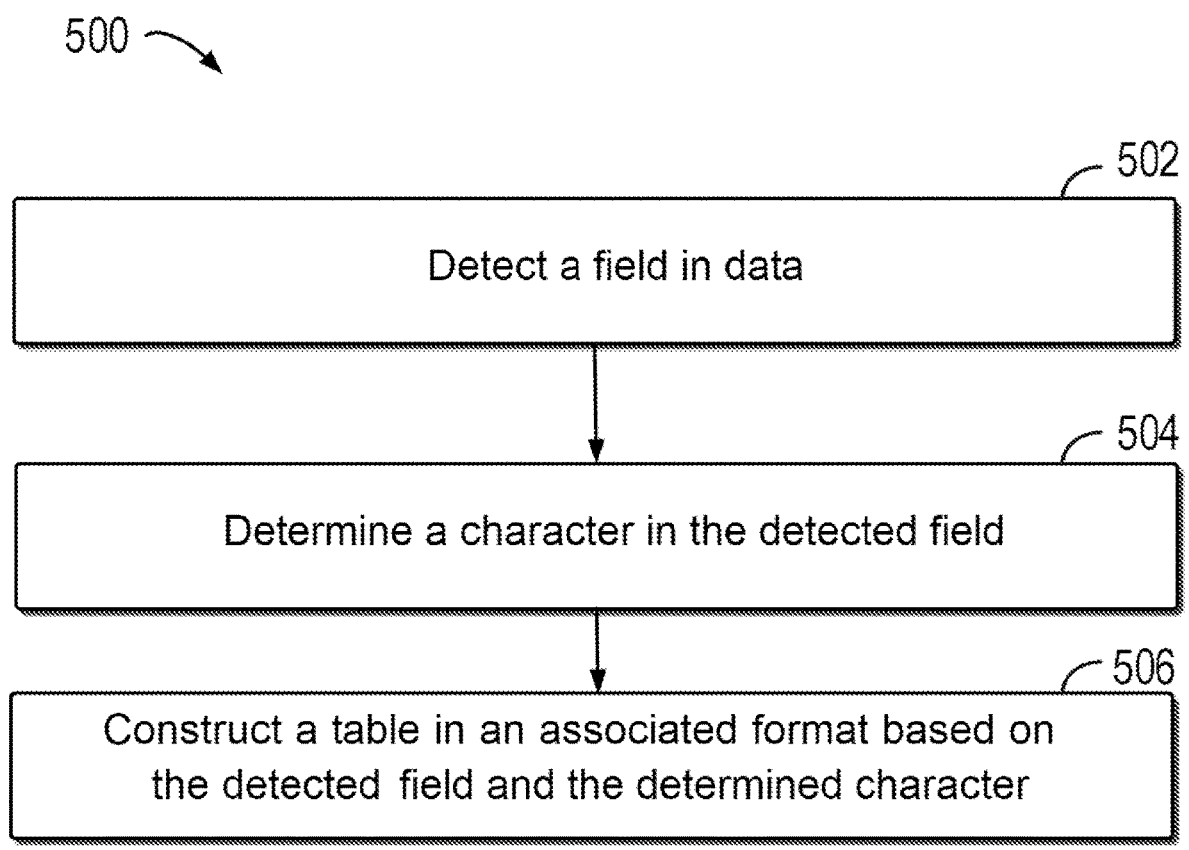
FIG. 5 shows a flow chart of a method for converting data of the semi-structured data type into tabular data according to an embodiment of the present disclosure.

FIG. 5 shows a flow chart of a method 500 for converting a semi-structured data type into tabular data according to an embodiment of the present disclosure. The method 500 may be performed at the computing device 120 in FIG. 1 or at any suitable computing device.

At block 502, the computing device 120 may detect a field in the data. The field may have a character. In some embodiments, the semi-structured data type may be data with a certain internal structure but not with a specific structure like that of the structured data, such as a PDF text with some internal structures. Taking the PDF text as an example, when receiving a PDF text of the semi-structured data type, the computing device 120 may perform operations such as text detection on the PDF text to recognize words in the text. After recognizing the words, the computing device 120 may detect fields in the data.

At block 504, the computing device 120 may determine characters in the detected fields. The characters may include various types of characters such as words, letters, symbols, and punctuation. In addition, after detecting the fields and characters, the computing device 120 may construct a file in, for example, a JSON format according to the detected fields and characters, so that it is more convenient for the computing device 120 to construct a table in an associated format in subsequent steps.

At block 506, the computing device 120 may construct a table in an associated format according to the detected fields and the characters in the fields. Moreover, in some embodiments, the fields in the data of the semi-structured data type may correspond to rows or columns in the table, and the characters in the fields are values in the corresponding rows or columns. For example, each field may be converted into a separate column in the table, and the characters in the field are values in the corresponding column. The table in the associated format after the conversion has parsed relationships between various fields in the original data and presents them in a more specific and intuitive format. Furthermore, the first generative mode corresponding to the table format may be applied to the converted table in the associated format to desensitize the converted data.

Figure 6:
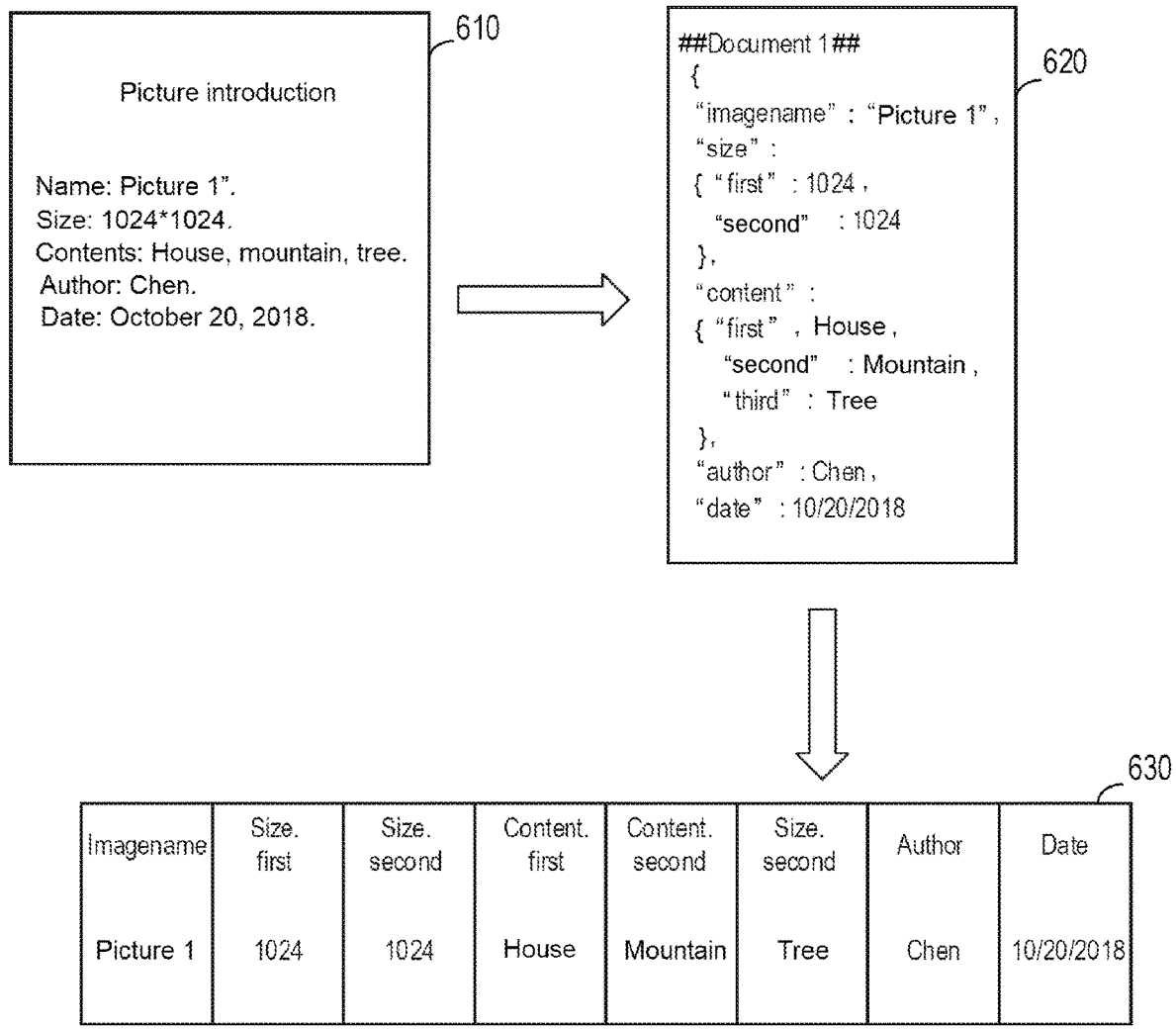
FIG. 6 shows an example process of converting data of the semi-structured data type.

FIG. 6 shows an example process of converting data of a semi-structured data type. As described in FIG. 6, an example of the data of the semi-structured data type represented by a PDF text is illustrated. The PDF text 610 is an example of introducing an image. The PDF text 610 includes data with a certain structure but not a specific structure like that of the structured data. Correspondingly, the computing device 120 may perform text recognition on the PDF text 610, so as to detect fields in the PDF text 610 and characters in the fields. After detection, the computing device 120 may convert the PDF text 610 into a JSON file 620, as shown in FIG. 6. Furthermore, the computing device 120 may construct a table 630 in an associated format according to the JSON file 620 after the conversion. In the constructed table 630, fields in the JSON file 620 correspond to columns in the table 630. For example, a field "imagename" corresponds to the first column, and so on. For a parent field (such as "size") with a child field, the computing device 120 may associate the child field with the parent field and set the associated fields after the association into different columns, as shown in the second column and the third column of the table 630 in FIG. 6, where "size.first" and "size.second" are located.

The detected characters are correspondingly values in various columns of the table 630. Furthermore, although not shown in the table 630 in FIG. 6, it is to be understood that the values of the columns in the table 630 may further include a key, and the key may be associated with another table. In other words, a value corresponding to the key is included in another table. The key allows access to another table to obtain a key value corresponding to the key.

In addition, although the above description takes columns in the table as an example, it is to be understood that the field in the data of the semi-structured data type may also be converted to rows in the table, which is not limited in the present disclosure. Although an illustrative embodiment of converting data of the semi-structured data type to a table is described above, it is to be understood that other appropriate methods may also be used to convert data of the semi-structured data type to data of other structured types. By adopting the conversion method according to embodiments of the present disclosure, the types of data that can be desensitized may be further expanded, thereby ensuring data security of more types of data.

In some embodiments, when the detected type includes the image type, the computing device 120 may select the second generative model. In some embodiments, the second generative model includes a second generative adversarial network. The second generative adversarial network is trained to generate generative data that is close to the original data. In some embodiments, the second generative adversarial network may include a generator and a discriminator. The generator may generate a synthetic image, while the discriminator may distinguish between the synthetic image and a real image.

The generator G is a neural network that takes random noise z as an input and generates a synthetic image G(z). The generator G is trained to learn underlying distribution of data by minimizing a difference between the synthetic image and the real image. The discriminator D is also a type of neural network that may take an image as an input and generate a probability value that represents whether the input image is real. The trained discriminator may provide a maximum probability value for a real image and a minimum probability value for a synthetic image. In other words, the trained discriminator can more accurately distinguish between a real image and a synthetic image.

The training of the second generative adversarial network may be characterized by a target represented by the following Equation (1):

$$\min_G \max_D V(D, G) = \mathbb{E}_{x \sim p_{data}(x)}[\log D(x)] + \mathbb{E}_{z \sim p_z(z)}[\log(1 - D(G(z)))] \quad (1)$$

where x represents a real image, z represents a random noise vector, $p_{data}(x)$ represents a data distribution, and $p_z(z)$ represents a noise distribution.

In some embodiments, the second generative adversarial network is trained by using sample images in which sensitive data has been desensitized. For example, the sensitive data in the sample images has been replaced, removed, or fuzzed. This may enable the second generative adversarial network to learn the underlying structure of the data distribution without capturing any sensitive information, thereby achieving the desensitization processing of the sensitive data. By using the second generative adversarial network, sensitive information in the image may be prevented from being leaked.

In some embodiments, further fine-tuning operations may be performed on the second generative adversarial network. For example, the second generative adversarial network may further be trained according to differential privacy, so that the trained second generative adversarial network can protect data more securely. The specific training process is not limited in the present disclosure. Those skilled in the art may perform specific fine-tuning operations on the second generative adversarial network according to application requirements.

Figure 7A:
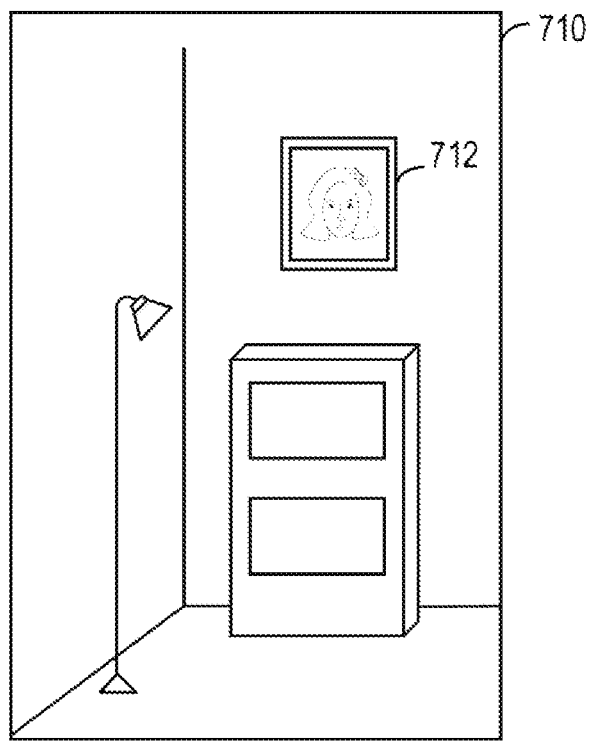
FIG. 7A and FIG. 7B show example diagrams comparing images before and after being processed using a second generative model corresponding to the image type according to an embodiment of the present disclosure.
Figure 7B:
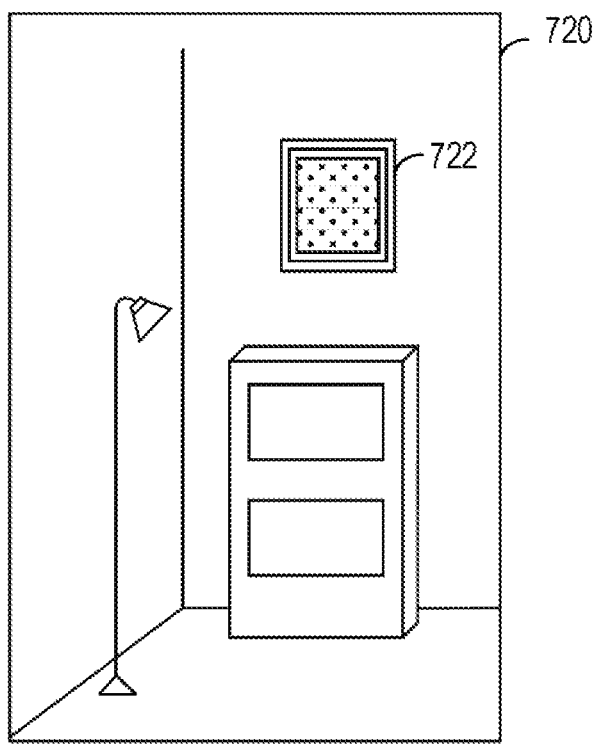

FIG. 7A and FIG. 7B show example diagrams comparing images before and after being processed using a second generative adversarial network corresponding to the image type according to an embodiment of the present disclosure. FIG. 7A illustrates a schematic diagram of an image 710 before being processed using the second generative adversarial network. For example, the image 710 in FIG. 7A shows an indoor image with a portrait photo 712 hung on the wall. In some cases, the portrait photo 712 may be considered as sensitive data and is not desired to be seen by other users. In this case, the image 710 may be processed through the second generative adversarial network, and the processed image 720 is as shown in FIG. 7B. In the processed image 720, the portrait photo 712 has been desensitized (for example, fuzzed) and displayed as a processed image 722, thereby effectively avoiding the leakage of sensitive information.

It is to be understood that although the sensitive information is fuzzed as shown in FIG. 7B, in other embodiments, the sensitive information in the processed image 720 may also be removed or replaced with another content by training the second generative adversarial network using appropriate sample images, which is not limited in the present disclosure.

As described above, when the detected type includes the text type, the computing device 120 may select the third generative model to desensitize the data. The third generative model may include a language processing model based on a neural network, and the model may generate multimodal synthetic information similar to original text information and does not include sensitive information in the original text information. In some embodiments, the third generative model may include an encoder and a decoder. The encoder is used for encoding data into a hidden representation that captures an underlying structure of data distribution of the data, and the decoder is used for generating synthetic data according to the hidden representation.

In some embodiments, the encoder may be a neural network that takes a text sequence x as an input, and the encoder may generate a hidden representation h=E(x). The encoder may be trained to minimize a difference between synthetic data and real text data. The decoder may be a neural network that takes the hidden representation as an input and may generate a synthetic text sequence y=D(h). The trained decoder may generate a text sequence similar to the original text sequence. A training process may be characterized by the following Equation (2):

$$\min L(x, y) = -\sum_{t=1}^{T} \log(P(y_t | y_1, \ldots, y_{t-1}, x)) \quad (2)$$

where x is an input text, y is an output synthetic text, T is the length of the text, and $P(y_t|y_1, \ldots, y_{t-1}, x)$ is a probability of the $t^{th}$ word in the synthetic text generated given the previous word of the input text.

In some embodiments, the third generative model is trained by using sample texts in which sensitive data has been desensitized. For example, sensitive information in the sample texts has been deleted, replaced, or fuzzed. In this way, the third generative model can be enabled to learn the underlying structure of the data distribution without capturing any sensitive information, thus realizing desensitization of the sensitive data. By using the third generative model, the sensitive information in the text may be prevented from being leaked.

FIG. 8A and FIG. 8B show example diagrams comparing texts before and after being processed using a third generative model corresponding to the text type according to an embodiment of the present disclosure. FIG. 8A illustrates an input text 810. A user may also input in an initial prompt 820 a requirement for hiding sensitive information in the input text 810. Accordingly, the computing device 120 may process the input text 810 in FIG. 8A by selecting the third model corresponding to the text type, and generate a synthetic output text 830, as shown in FIG. 8B. In the output synthetic data, a name of a purchaser involved in the input text 810 is replaced, the date of purchase is removed, and specific items purchased (such as a pair of headphones and a pair of sneakers) are fuzzed by, for example, fuzzing using "some items." This may enable sensitive information in the input text 810 to be hidden, thereby preventing user privacy (for example, information such as the name) from being leaked.

Advantageously, the method for processing data according to embodiments of the present disclosure processes the data by combining various types of generative models, the application potential of various generative models can be fully exploited, so that desensitization processing of a plurality of types of data can be realized more quickly and accurately, and leakage of sensitive information can be avoided, thereby ensuring the data security of various types of multi-modal data.

Figure 9:
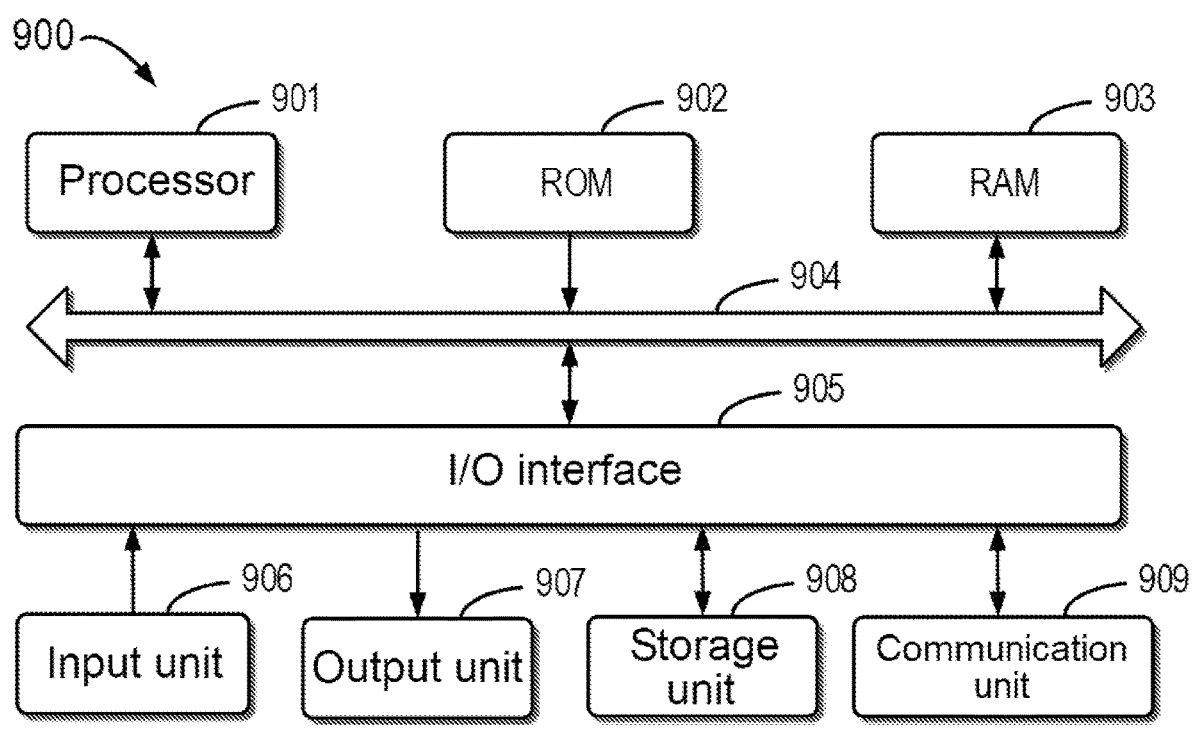
FIG. 9 is a block diagram of an example device suitable for implementing an embodiment of the present disclosure.

FIG. 9 is a block diagram of an example device 900 that can be used for implementing an embodiment of the present disclosure. The computing device 120 and the computing device 110 in FIG. 1 and the like may all be implemented by using the device 900. As shown in the figure, the device 900 includes a processor 901 which may perform various appropriate actions and processing according to computer program instructions stored in a read-only memory (ROM) 902 or computer program instructions loaded from a storage unit 908 to a random access memory (RAM) 903. Various programs and data required for operations of the device 900 may also be stored in the RAM 903. The processor 901, the ROM 902, and the RAM 903 are connected to each other through a bus 904. An input/output (I/O) interface 905 is also connected to the bus 904.

A plurality of components in the device 900 are connected to the I/O interface 905, including: an input unit 906, such as a keyboard and a mouse; an output unit 907, such as various types of displays and speakers; a storage unit 908, such as a magnetic disk and an optical disc; and a communication unit 909, such as a network card, a modem, and a wireless communication transceiver. The communication unit 909 allows the device 900 to exchange information/data with other devices via a computer network, such as the Internet, and/or various telecommunication networks.

The various processes and processing described above, such as the method 200 for processing data and the related processes, may be performed by the processor 901. For example, in some embodiments, the method 200 for processing data and the related processes may be implemented as a computer software program that is tangibly included in a machine-readable medium, such as the storage unit 908. In some embodiments, part or all of the computer program may be loaded and/or installed onto the device 900 via the ROM 902 and/or the communication unit 909. When the computer program is loaded into the RAM 903 and executed by the processor 901, one or more of the actions described above for the method 200 for processing an image and the related processes may be performed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method for processing data, comprising:
   detecting a type of the data, wherein the data comprises sensitive data;
   selecting, according to the detected type, a generative model corresponding to the type from a plurality of generative models; and
   processing the data by using the selected generative model to desensitize the sensitive data from the data,
   wherein the type comprises at least one type of a tabular type, a semi-structured data type, an image type, and a text type, the plurality of generative models comprise a first generative model corresponding to the tabular type, a second generative model corresponding to the image type, and a third generative model corresponding to the text type, and the first generative model, the second generative model, and the third generative model are different from one another, wherein responsive to the detected type being the semi-structured data type, the data is converted from semi-structured data into tabular data suitable for application as an input to the first generative model corresponding to the tabular type, and wherein the second generative model corresponding to the image type is configured to process data comprising an input image containing one or more sensitive visual elements and to generate from the input image an output image in which the one or more sensitive visual elements of the input image are at least partially replaced by respective corresponding desensitized visual elements.

2. The method according to claim 1, wherein desensitizing the sensitive data from the data comprises:
   removing the sensitive data from the data;
   replacing the sensitive data in the data; or
   fuzzing the sensitive data in the data.

3. The method according to claim 1, wherein selecting a generative model corresponding to the type from a plurality of generative models comprises:
   selecting the first generative model when the detected type is the tabular type, wherein the first generative model comprises a first generative adversarial network.

4. The method according to claim 3, wherein selecting a generative model corresponding to the type from a plurality of generative models comprises:
   converting the data into tabular data when the detected type of the data is the semi-structured data type; and
   selecting the first generative model corresponding to the tabular type from the plurality of generative models.

5. The method according to claim 4, wherein converting the data into tabular data comprises:
   detecting a field in the data;
   determining a character in the detected field; and constructing a table in an associated format based on the detected field and the character in the field,
wherein the field corresponds to a row or column in the table, and the character represents a value in the row or column.

6. The method according to claim 1, wherein selecting a generative model corresponding to the type from a plurality of generative models comprises:
selecting the second generative model when the detected type comprises the image type, wherein the second generative model comprises a second generative adversarial network.

7. The method according to claim 6, wherein the second generative adversarial network is trained by using sample images in which sensitive data have been desensitized.

8. The method according to claim 1, wherein selecting a generative model corresponding to the type from a plurality of generative models comprises:
selecting the third generative model to desensitize the data when the detected type comprises the text type.

9. The method according to claim 8, wherein the third generative model comprises an encoder and a decoder, the encoder is used for encoding the data into a hidden representation that captures an underlying structure of data distribution of the data, and the decoder is used for generating synthetic data according to the hidden representation, wherein the synthetic data corresponds to the data in which the sensitive data is desensitized.

10. The method according to claim 8, wherein the third generative model is trained by using sample texts in which sensitive data has been desensitized.

11. An electronic device, comprising:
at least one processor; and
at least one memory, the at least one memory being coupled to the at least one processor and storing instructions used for execution by the at least one processor, wherein the instructions, when executed by the at least one processor, cause the electronic device to perform actions comprising:
detecting a type of data, wherein the data comprises sensitive data;
selecting, according to the detected type, a generative model corresponding to the type from a plurality of generative models; and
processing the data by using the selected generative model to desensitize the sensitive data from the data,
wherein the type comprises at least one type of a tabular type, a semi-structured data type, an image type, and a text type, the plurality of generative models comprise a first generative model corresponding to the tabular type, a second generative model corresponding to the image type, and a third generative model corresponding to the text type, and the first generative model, the second generative model, and the third generative model are different from one another, wherein responsive to the detected type being the semi-structured data type, the data is converted from semi-structured data into tabular data suitable for application as an input to the first generative model corresponding to the tabular type, and wherein the second generative model corresponding to the image type is configured to process data comprising an input image containing one or more sensitive visual elements and to generate from the input image an output image in which the one or more sensitive visual elements of the input image are at least partially replaced by respective corresponding desensitized visual elements.

12. The electronic device according to claim 11, wherein selecting a generative model corresponding to the type from a plurality of generative models comprises: selecting the first generative model when the detected type is the tabular type, wherein the first generative model comprises a first generative adversarial network.

13. The electronic device according to claim 12, wherein selecting a generative model corresponding to the type from a plurality of generative models comprises:
converting the data into tabular data when the detected type of the data is the semi-structured data type; and
selecting the first generative model corresponding to the tabular type from the plurality of generative models.

14. The electronic device according to claim 13, wherein converting the data into tabular data comprises:
detecting a field in the data;
determining a character in the detected field; and
constructing a table in an associated format based on the detected field and the character in the field,
wherein the field corresponds to a row or column in the table, and the character represents a value in the row or column.

15. The electronic device according to claim 11, wherein selecting a generative model corresponding to the type from a plurality of generative models comprises: selecting the second generative model when the detected type comprises the image type, wherein the second generative model comprises a second generative adversarial network.

16. The electronic device according to claim 15, wherein the second generative adversarial network is trained by using sample images in which sensitive data have been desensitized.

17. The electronic device according to claim 11, wherein selecting a generative model corresponding to the type from a plurality of generative models comprises: selecting the third generative model to desensitize the data when the detected type comprises the text type.

18. The electronic device according to claim 17, wherein the third generative model comprises an encoder and a decoder, the encoder is used for encoding the data into a hidden representation that captures an underlying structure of data distribution of the data, and the decoder is used for generating synthetic data according to the hidden representation, wherein the synthetic data corresponds to the data in which the sensitive data is desensitized.

19. The electronic device according to claim 17, wherein the third generative model is trained by using sample texts in which sensitive data has been desensitized.

20. A computer program product, the computer program product being tangibly stored on a non-transitory computer-readable medium and comprising machine-executable instructions, wherein the machine-executable instructions, when executed by a machine, cause the machine to perform the following steps:
detecting a type of data, wherein the data comprises sensitive data;
selecting, according to the detected type, a generative model corresponding to the type from a plurality of generative models; and
processing the data by using the selected generative model to desensitize the sensitive data from the data,
wherein the type comprises at least one type of a tabular type, a semi-structured data type, an image type, and a text type, the plurality of generative models comprise a first generative model corresponding to the tabular type, a second generative model corresponding to the image type, and a third generative model corresponding to the text type, and the first generative model, the second generative model, and the third generative model are different from one another, wherein responsive to the detected type being the semi-structured data type, the data is converted from semi-structured data into tabular data suitable for application as an input to the first generative model corresponding to the tabular type, and wherein the second generative model corresponding to the image type is configured to process data comprising an input image containing one or more sensitive visual elements and to generate from the input image an output image in which the one or more sensitive visual elements of the input image are at least partially replaced by respective corresponding desensitized visual elements.

* * * * *